United States Patent [19]
Sekine et al.

[11] Patent Number: 5,748,476
[45] Date of Patent: May 5, 1998

[54] VEHICLE CONTROL SYSTEM

[75] Inventors: Hiroshi Sekine; Kazuya Tamura, both of Saitama, Japan

[73] Assignee: Honda Giken Kogyo Kabushiki Kaisha, Tokyo, Japan

[21] Appl. No.: 471,715

[22] Filed: Jun. 5, 1995

[30] Foreign Application Priority Data

Nov. 22, 1994 [JP] Japan .................................. 6-288240

[51] Int. Cl.$^6$ .............................................. G06F 165/00
[52] U.S. Cl. .................. 364/449; 364/426.04; 364/460; 340/903; 340/990; 340/995
[58] Field of Search .................................. 364/443, 444, 364/449, 426.04, 460, 461; 73/178 R; 340/903, 988, 990, 995; 180/167, 168, 169

[56] References Cited

U.S. PATENT DOCUMENTS

| | | | |
|---|---|---|---|
| 5,444,629 | 8/1995 | Kishi et al. | 364/449 |
| 5,465,089 | 11/1995 | Nakatani et al. | 364/449 |
| 5,539,397 | 7/1996 | Asanuma et al. | 340/995 |
| 5,546,311 | 8/1996 | Sekine | 364/449 |

FOREIGN PATENT DOCUMENTS

6089298  5/1985  Japan .

*Primary Examiner*—Gary Chin
*Attorney, Agent, or Firm*—Weiner, Carrier & Burt, P.C.; Joseph P. Carrier; Irving M. Weiner

[57] ABSTRACT

A vehicle control system which controls a vehicle in accordance with the curvature of a road as determined from map information comprising a set of coordinate points which represent the course of the road. A passable vehicle speed enabling the vehicle to pass through a plurality of nodes existing at predetermined distances within an operating section established on the road ahead of a given vehicle position is calculated on the assumption that a voluntary speed reduction has been conducted. The radii of a first virtual turning locus and a second virtual turning locus produced at a predetermined lateral acceleration are calculated based on the passable vehicle speeds at the nodes. A passable zone, a warning zone and an automatic speed-reducing zone are established based on the first and second virtual turning locus radii. If any of the nodes ahead of the virtual vehicle position exists in the warning zone, a warning is provided to the driver. If any of the nodes ahead of the virtual vehicle position exists in the automatic speed-reducing zone, automatic speed reduction of the vehicle is carried out.

9 Claims, 7 Drawing Sheets

VEHICLE CONTROL SYSTEM

BACKGROUND OF THE INVENTION

1. Field of the Invention

The present invention relates to a vehicle control system which controls a vehicle according to the course or curvature of a road as determined on the basis of map information comprised of a set of coordinate points representing the road.

2. Description of the Prior Art

There is a known technique disclosed in Japanese Patent Application Laid-open No. 89298/85, which involves evaluating the radius of curvature of a curve ahead of a subject vehicle in the direction of travel based on map data provided by a navigation system. The system determines whether the vehicle can pass through the curve at the current vehicle speed, and gives a warning to the driver if it is determined that the vehicle cannot pass through the curve safely at the current speed.

It is often the case that the driver appraises a curve existing ahead of the vehicle in the traveling direction by a visual judgment or by previous experience. Normally, the driver voluntarily performs the speed-reducing operation required for the vehicle to safely pass through a curve.

However, the known technique determines the advisability of passing through a curve on the assumption that, until the vehicle enters the curve, the driver does not voluntarily reduce speed. Therefore, it is often the case that a warning and an automatic speed-reduction are conducted earlier than required, resulting in a problem with interference with the driver's driving operation which is troublesome for the driver.

SUMMARY OF THE INVENTION

Accordingly, it is an object of the present invention to provide a warning and an automatic speed-reduction with an appropriate timing while avoiding interference with the driver's voluntary speed-reduction at a location short of the curve.

To achieve the above object, according to the present invention there is provided a vehicle control system, comprising: map information outputting means for outputting a map comprised of a plurality of coordinate points representing a road; vehicle position detecting means for detecting a position of a subject vehicle on the map; vehicle speed detecting means for detecting a vehicle speed; operating-section calculation means for calculating an operating section in which it is determined whether the vehicle speed is appropriate based on a detected vehicle speed; passable vehicle speed calculation means for calculating a passable vehicle speed at a virtual vehicle position which is established in the operating section, based on the detected vehicle speed and a distance from the vehicle position to the virtual vehicle position; zone establishing means for establishing a passage determining zone having the passable vehicle speed as a criterion based on the virtual vehicle position; passing condition determining means for determining a passing condition by comparing the passage determining zone with a coordinate point located ahead of the virtual vehicle position within the operating section; and vehicle control means for controlling the vehicle based on a result of the determination by the passing condition determining means.

With the above arrangement, the passage determining zone established based on the passable vehicle speed is compared with the coordinate points of the road existing ahead of the virtual vehicle position, and therefore, the passing condition of the vehicle is accurately determined to provide a control such as the warning and the automatic speed-reduction. At that time, the calculation of the vehicle speed is conducted not only based on the detected vehicle speed but also based on the distance from the vehicle position to the virtual vehicle position. Accordingly, in view of a voluntary vehicle speed-reduction conducted by the driver before arriving at the virtual vehicle position, it is possible to avoid the inconvenience of unnecessary warning and automatic speed reduction.

If the passable vehicle speed calculation means sequentially establishes the plurality of coordinate points included within the operating section in sequence as the virtual vehicle positions, and accurately determines the condition of passing through the coordinate points ahead of the virtual vehicle position, it can be accurately determined whether the vehicle can pass through the coordinate points included within the operating section.

If the radius of a virtual turning locus of the vehicle is calculated based on the passable vehicle speed and the passage determining zone is established based on the radius of the virtual turning locus, the passage determining zone can be accurately determined with a simple calculation.

If the passable vehicle speed calculating means calculates the passable vehicle speed as a vehicle speed resulting from a speed reduction conducted at a predetermined reference speed-reducing rate from the vehicle position to the virtual vehicle position, it is possible to accurately calculate the passable vehicle speed by a simple calculation.

If the vehicle control means is a means for providing a warning to the driver, when it is determined that it is difficult for the vehicle to pass through the curve without speed reduction, the driver can be accurately informed of the determination.

If the vehicle control means is a means for controlling the vehicle speed, when it is judged that it is difficult for the vehicle to pass through the curve without speed reduction, the vehicle speed can be automatically reduced.

If the passage determining zone includes a warning zone to provide a warning to the driver and an automatic speed-reducing zone to automatically reduce the vehicle speed, it is possible to cope with the degree of difficulty of passing through the curve.

If the zone establishing means establishes a warning zone and an automatic speed-reducing zone based on a predetermined reference lateral acceleration, it is possible to accurately establish the warning zone and the automatic speed-reducing zone.

If the zone establishing means establishes a warning zone and an automatic speed-reducing zone based on a predetermined reference deceleration, it is possible to accurately establish the warning zone and the automatic speed-reducing zone.

The above and other objects, features and advantages of the invention will become apparent from the following description of the preferred embodiments taken in conjunction with the accompanying drawings.

DETAILED DESCRIPTION OF THE PREFERRED EMBODIMENTS

A first embodiment of the present invention will now be described with reference to FIGS. 1 to 6.

Figure 1:
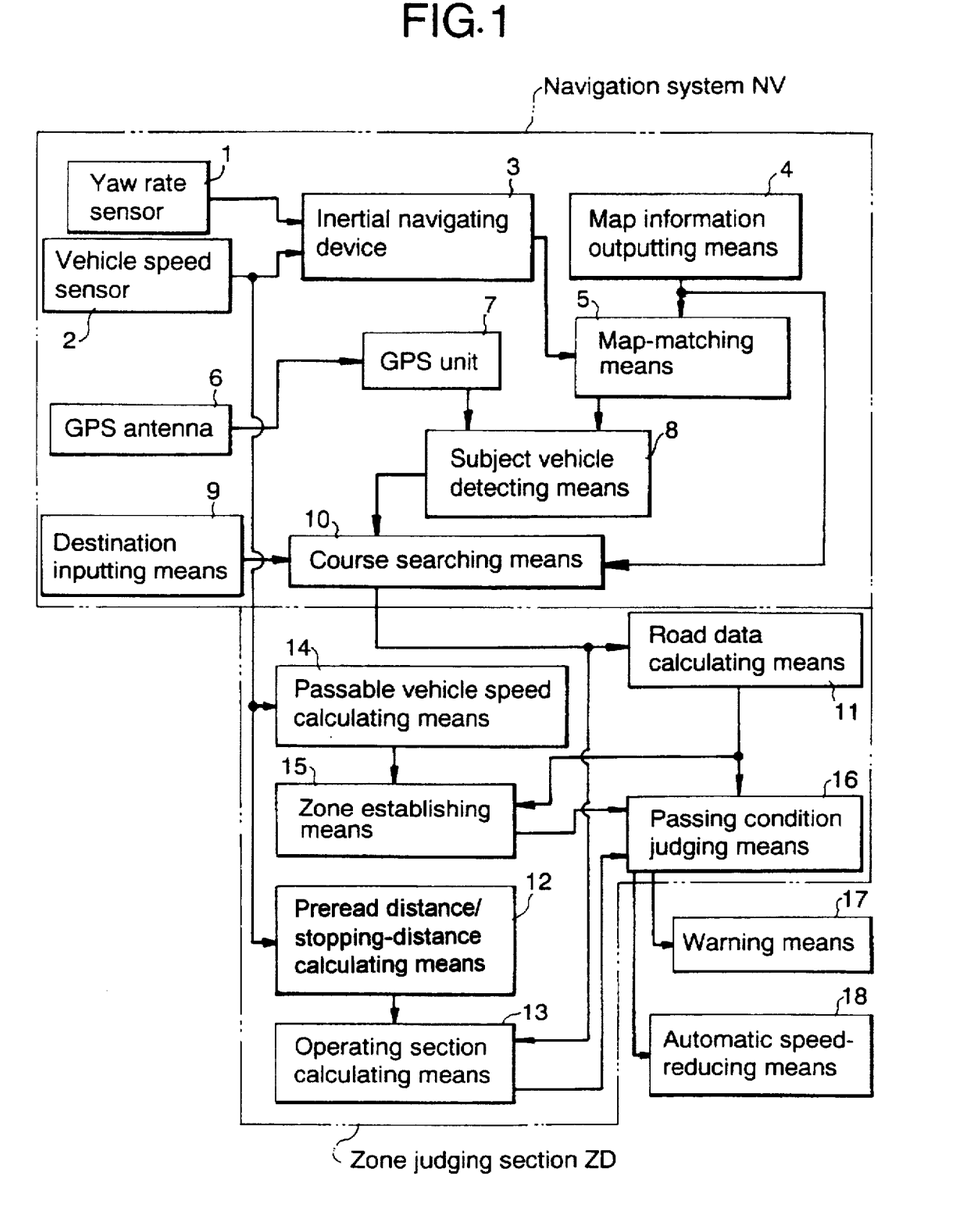
FIG. 1 is a block diagram illustrating the entire arrangement of a vehicle control system according to a first embodiment of the present invention.

In FIG. 1, reference character NV represents a navigation system for a vehicle. The navigation system NV includes an inertial navigating device 3 to which signals from a yaw rate sensor 1 and a vehicle speed sensor 2 (vehicle speed detecting means) are supplied, map information outputting means 4 using an IC card or CD-ROM, and map-matching means 5 that overlaps a vehicle-traveling locus outputted from the inertial navigating device 3 and map information outputted from the map information outputting means 4. Also provided is a GPS unit 7 to which a signal from a GPS antenna 6 is supplied, vehicle position detecting means 8 for detecting a vehicle position based on the position coordinates outputted from the map-matching control means 5 and the position coordinates outputted from the GPS unit 7, and course searching means 10 for searching the course until the destination based on a destination coordinates signal from the destination inputting means 9 and the vehicle position coordinates signal from the vehicle position detecting means 8.

Reference character ZD represents a zone determining section. The zone determining section includes road data calculation means 11 for calculating data of a road ahead of the vehicle as coordinates of a plurality of nodes (which will be described hereinafter) based on an output from the course searching means 10, and preread distance and stopping distance calculation means 12 for calculating a preread distance Sa and a stopping distance Sb (which will be described hereinafter) based on an output from the vehicle speed sensor 2. Also provided is operating section calculation means 13 for calculating an operating section A (which will be described hereinafter) based on the course as well as the preread distance (Sa) and the stopping distance Sb, passable vehicle speed calculation means 14 for calculating a passable vehicle speed $V_k$ (which will be described hereinafter) based on an output from the vehicle sensor 2, zone establishing means 15 for establishing a passable zone $Z_1$, a warning zone $Z_2$, and an automatic speed-reducing zone $Z_3$ (all of which will be described hereinafter) based on the road data and the passable vehicle speeds, and passing condition determining means 16 for determining whether the nodes of the road ahead of the subject vehicle exist in which zone $Z_1$, $Z_2$, or $Z_3$, by overlapping the nodes existing in the operating section A with each of the zones $Z_1$, $Z_2$, and $Z_3$. Each of the zones $Z_1$, $Z_2$, and $Z_3$ constitutes a passage determining zone in the present invention.

Connected to the passing condition determining means 16 are alarm or warning means 17 (vehicle control means) such as a buzzer, a chime and a lamp, and automatic speed-reducing means 18 comprising engine output reducing means or braking means. If the node ahead of the subject vehicle exists in the warning zone $X_3$, an alarm is provided to the driver by the alarm means 17. If the node ahead of the vehicle exists in the automatic speed-reducing zone $Z_3$, an automatic speed reduction is carried out by the automatic speed-reducing means 18.

Figure 2:
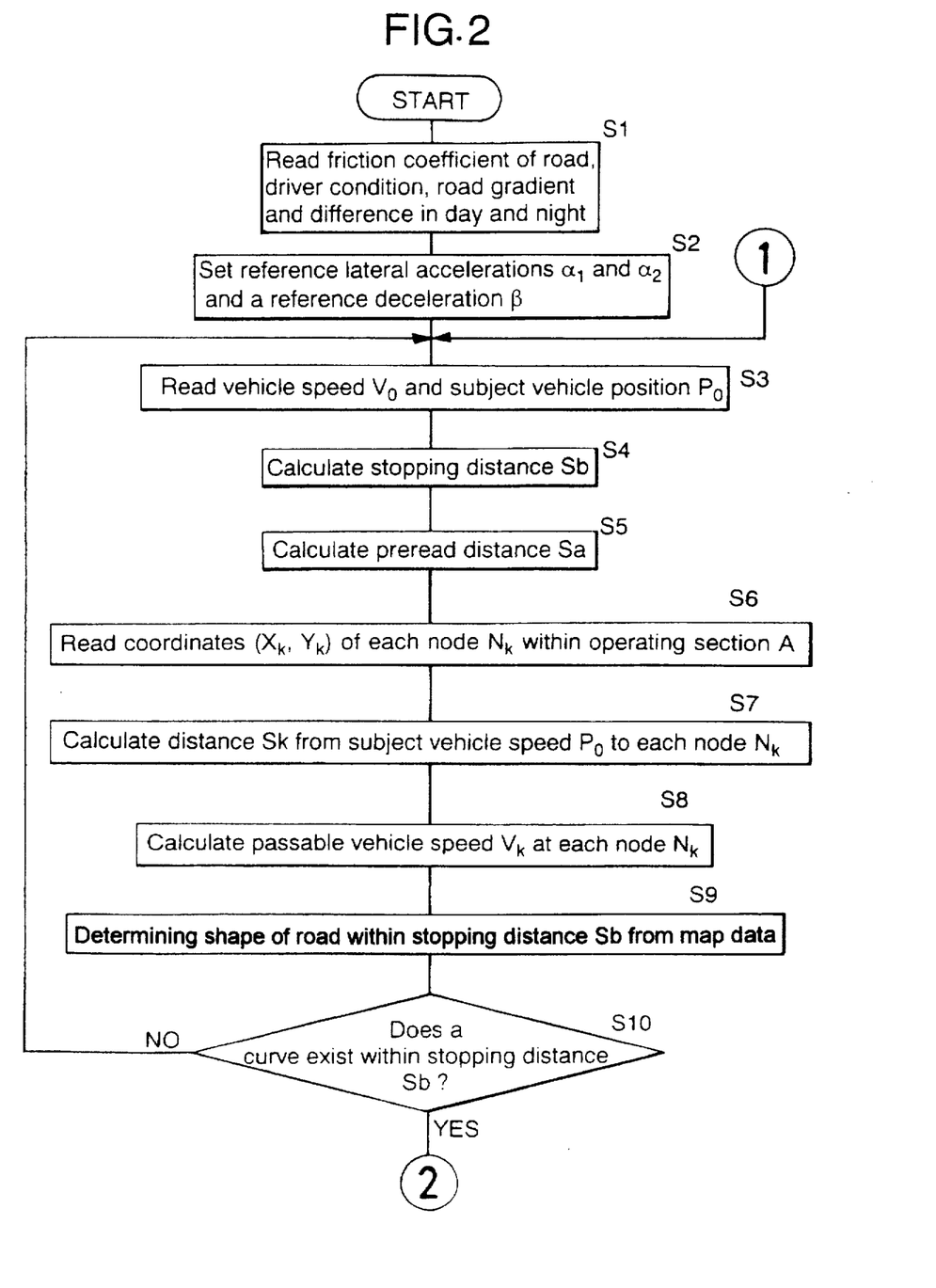
FIG. 2 is a first portion of a flow chart.
Figure 3:
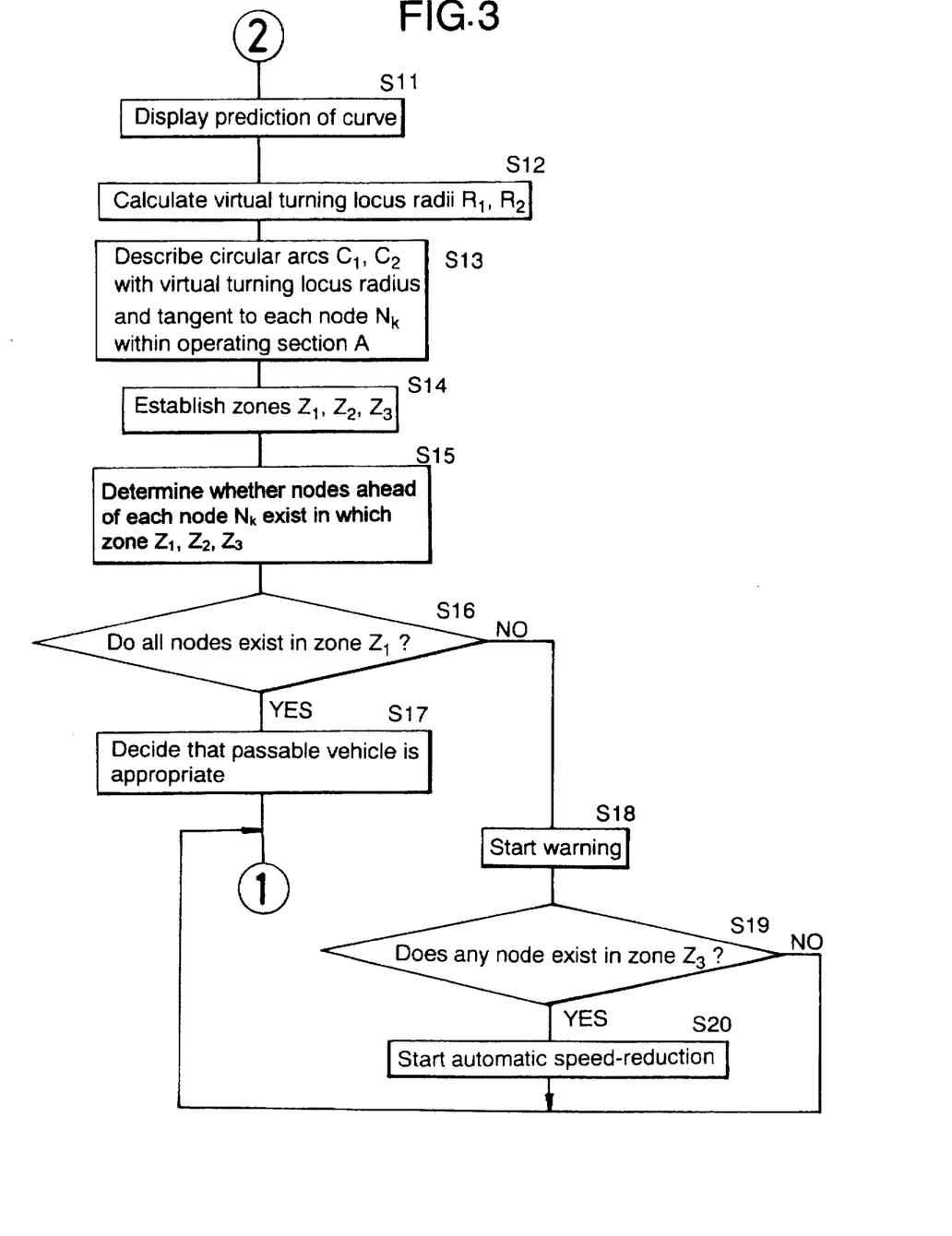
FIG. 3 is a second portion of the flow chart of FIG. 2.

The operation of the embodiment of the present invention provided with the above-described arrangement will be described below with reference to FIG. 1 in combination with the flow chart shown in FIGS. 2 and 3.

First, factors influencing control such as a coefficient of friction of the road surface, driver's conditions (driving skill and fatigue conditions), a road gradient, whether it is night or day and the like, are read (at step S1). Then, predetermined reference lateral accelerations $\alpha_1$, $\alpha_2$ and a predetermined reference deceleration $\beta$ are set based on the various factors (at step S2).

As used herein, symbol $\alpha_1$ represents a first reference lateral acceleration used for providing the alarm when there is a possibility that the vehicle will exceed the lateral acceleration when it is passing through a curve. The symbol $\alpha_2$ represents a second reference lateral acceleration used for conducting the automatic speed-reduction, when there is a possibility that the vehicle will exceed the lateral acceleration when the vehicle is passing through a curve. For example, the first reference lateral acceleration $\alpha_1$ is set in a range of 2–3 m/sec², and the second reference lateral acceleration $\alpha_2$ is set in a range of 4–6 m/sec² ($\alpha_2 > \alpha_1$). The symbol $\beta$ represents a reference deceleration at which the current vehicle speed is reduced by voluntary braking by the driver.

The values of $\alpha_1$, $\alpha_2$, and $\beta$ are changed based on the factors read at step S1, such as the coefficient of friction of the road surface, the driver's conditions, the road gradient, whether it is night or day and the like. More specifically, when there are adverse conditions such as when the coefficient of friction of the road surface is relatively small, when the driver's condition is poor, when the road gradient is downward, and/or when the visibility is poor at night, $\alpha_1$, $\alpha_2$, and $\beta$ are set at smaller values (for the sake of safety) in order to provide the alarm or the automatic speed-reduction early on (for the sake of safety).

Then, a vehicle speed $V_0$ is read from the vehicle speed sensor 2, and the coordinates $P_0$ ($X_0$, $Y_0$) of a vehicle position ($P_0$) are read from the vehicle position detecting means in the navigation system NV (at step S3).

Next, the stopping distance Sb is calculated by the preread distance and stopping distance calculating means (12) (at step S4). The stopping distance Sb corresponds to a distance required for the vehicle to be stopped, when the vehicle is decelerated from the current vehicle speed $V_0$ at the reference deceleration $\beta$. Namely, the stopping distance Sb is calculated according to the equation (1):

$$Sb = V_0^2/2\beta \tag{1}$$

Subsequently, the preread distance Sa is calculated by the preread distance/stopping distance calculating means 12 (at step 5). When the vehicle is decelerated for a predetermined preread time t from the current vehicle speed $V_0$ at the reference deceleration $\beta$, the preread distance Sa corresponds to a distance through which the vehicle travels within the preread time t. Namely, the preread distance Sa is calculated according to the following equation (2):

$$Sa = V_0 t - (\beta t^2/2) \tag{2}$$

Next, the operating section A defined by a preread distance Sa and a stopping distance Sb on the road ahead of the vehicle searched by the course searching means 10, is calculated by the operating section calculating means 13. At the same time, the coordinates $N_k$ $(X_k, Y_k)$ of the nodes $N_k$ (k=1, 2, 3 ... n) established on the road in the operating section A is calculated by the road data calculating means (11) (at step S6).

Then, the distances $S_k$ between the vehicle position $P_0$ $(X_0, Y_0)$ and the nodes $N_k$ $(X_k, Y_k)$ are calculated (at step S7).

Then, when the speed reduction is carried out from the current vehicle speed $V_0$ at the reference deceleration β in the vehicle position $P_0$ $(X_0, Y_0)$ until the vehicle arrives at each node $N_k$ $(X_k, Y_k)$, the passable vehicle speed $V_k$ (k=1, 2, 3 ... n) at each of the nodes $N_k$ $(X_k, Y_k)$ is calculated (at step S8). Namely, the distance Sk (k=1, 2, 3 ... n) is provided according to the following equation (3):

$$S_k = (V_0^2 - V_k^2)/2\beta \quad (3)$$

Therefore, the passable vehicle speeds $V_k$ are calculated from the following equation (4):

$$V_k = (V_0^2 - 2\beta S_k)^{1/2} \quad (4)$$

Then, the road course within the stopping distance Sb is determined based on road data from the road data calculating means 11 (at step S9). If a curve exists within the stopping distance Sb (step S10), a preliminary notice of the curve is provided by the alarm or warning means (17) such as a lamp (at step S11).

Next, the nearest node $N_1$ existing within the operating section A is chosen as the virtual vehicle position $N_1$ by the zone establishing means 15. At the same time, the radius $R_1$ of first virtual turning loci and the radius $R_2$ of each of second virtual turning loci at all the nodes $N_2$ ... existing at the virtual vehicle position $N_1$ and within the operating section A ahead of the virtual vehicle position N1 are calculated based on the passable vehicle speed $V_k$ and the first and second standard lateral acceleration $\alpha_1, \alpha_2$ at each of nodes $N_k$ according to the following equations (5) and (6) (at step S12):

$$R_1 = V_k^2/\alpha_1 \quad (5)$$

$$R_2 = V_k^2/\alpha_2 \quad (6)$$

The first virtual turning locus radius $R_1$ is the radius of a turning locus along which the vehicle can pass through a curve at the first reference lateral acceleration $\alpha_1$, when the vehicle enters the curve at the passable vehicle speed $V_k$, and the second virtual turning locus radius $R_2$ is the radius of a turning locus along which the vehicle can pass through a curve at the second reference lateral acceleration $\alpha_2$, when the vehicle enters the corner at the passable vehicle speed $V_k$.

Figure 4:
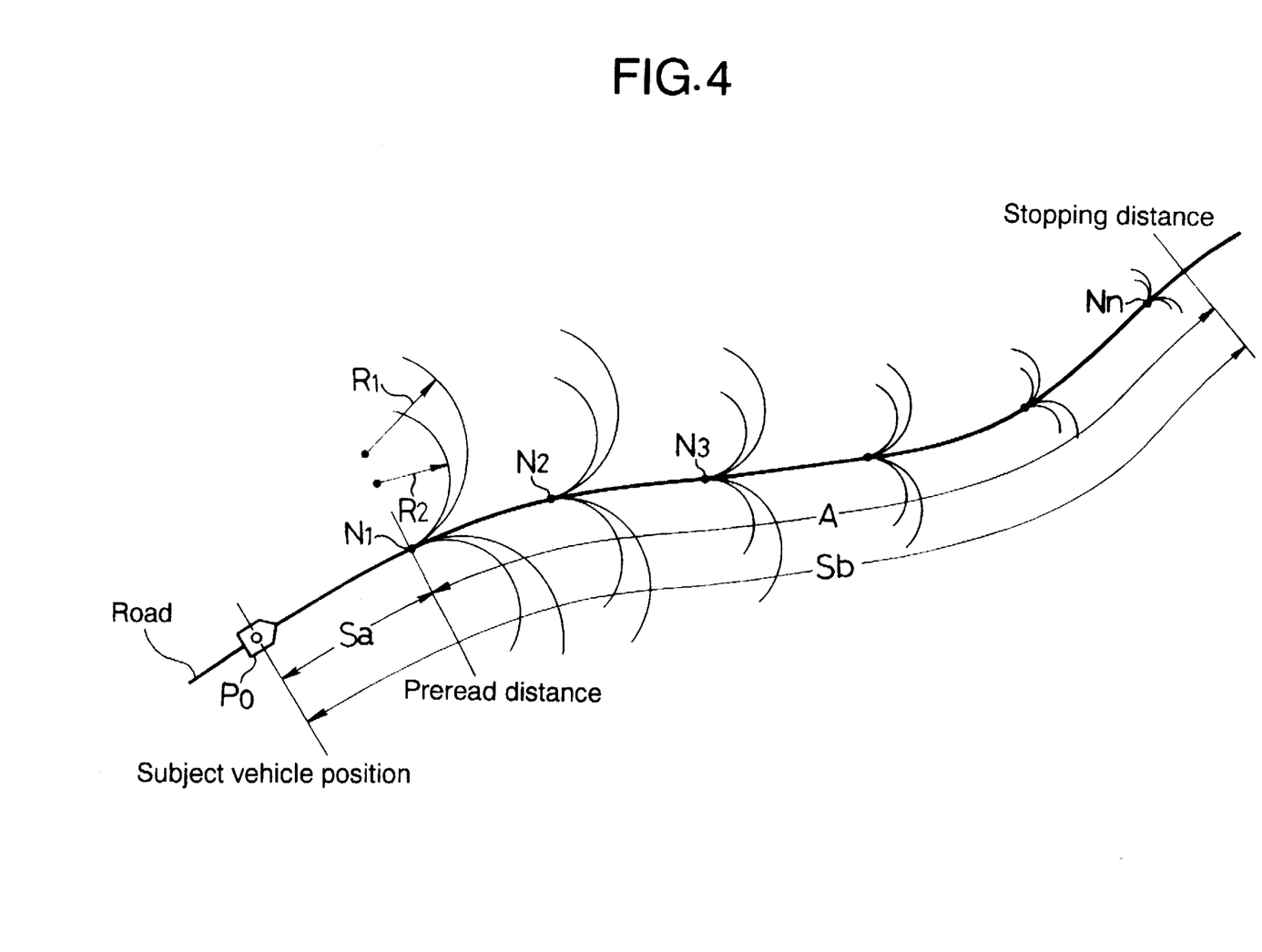
FIG. 4 is a diagram illustrating the established condition of zones on the road.

Next, a pair of left and right circular arcs $C_1, C_1$ having the first virtual turning locus radius $R_1$ calculated at step S12 and a pair of left and right circular arcs $C_2, C_2$ having the second virtual turning locus radius $R_2$ also calculated at step S12 are described so that they are tangent to left and right opposite sides of the road at each node $N_k$ (at step S13). As a result, the circular arcs $C_1, C_1$ and circular arcs $C_2, C_2$ are described on the left and right opposite sides at each node $N_k$, as illustrated in FIG. 4, and the farther away from the vehicle position $P_0$ forwardly in an advancing direction, the radii of circular arc $C_1, C_1$ and $C_2, C_2$ (namely, the first virtual turning locus radius $R_1$ and the second virtual turning locus radius $R_2$) are smaller.

Figure 5:
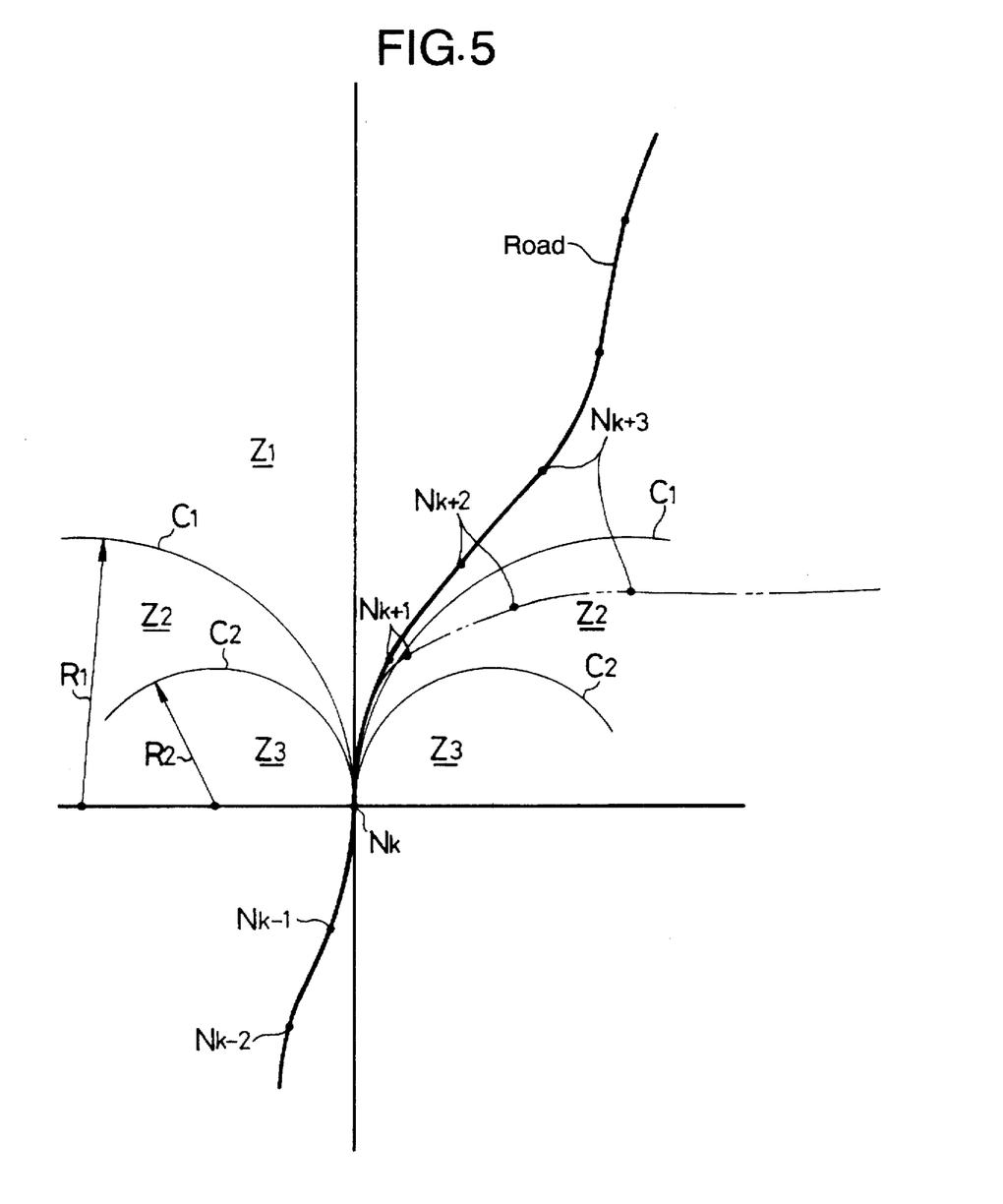
FIG. 5 is a diagram illustrating the relationship between the road and the zones at node $N_k$.

Then, the passable zone $Z_1$, the warning zone $Z_2$ and the automatic vehicle speed-reducing zone $Z_3$ which are demarcated by the four circular arcs $C_1, C_1$, and $C_2, C_2$, are established by the zone establishing means 15 (at step S14). As illustrated in FIG. 5, the passable zone $Z_1$ is established in front of the pair of circular arcs $C_1, C_1$; the warning zone $Z_2$ is established in the area between the pair of circular arcs $C_1, C_1$ and the pair of circular arcs $C_2, C_2$; and the automatic speed-reduction zone $Z_3$ is established in the area in the rear of the pair of circular arcs $C_2, C_2$.

Then, the nearest node $N_1$ in the operating section A is first established as a virtual vehicle position, and it is determined whether the nodes $N_2, N_3, N_4, ... N_n$ existing forwardly of the nearer node $N_1$ are in which zone $Z_1, Z_2$ or $Z_3$. This operation is carried out at all the virtual vehicle positions $N_1$, to $N_n$, while sequentially displacing the virtual vehicle position from the nearest node N1 to the farthest node $N_n$ (at step S15). For example, in FIG. 5 the node $N_k$ is established as the virtual vehicle position. In the road shown by a solid line, the nodes $N_{k+1}, N_{k+2}$ and $N_{k+3}$ in front of the virtual vehicle position $N_k$ are in the passable zone $Z_1$. In the road shown by a dashed line, the nodes $N_{k+1}, N_{k+2}$ and $N_{k+3}$ in front of the virtual vehicle position $N_k$ are in the warning zone $Z_2$.

However, if the answer at step S16 is "YES", i.e., if the ahead nodes $N_{k+1}, N_{k+2} ... N_n$ are in the passable zone $Z_1$ for all the virtual vehicle positions $N_k$, then it is decided that the vehicle can pass through a curve determined at step S9 at an appropriate speed (at step S17), returning to step S3.

On the other hand, if the answer at step 16 is "NO", i.e., if any of the nodes $N_{k+1}, N_{k+2} ... N_n$ ahead of the virtual vehicle position $N_k$ is in the warning zone $Z_2$ or in the automatic speed-reducing zone $Z_3$, then a warning or alarm is provided to the driver by operating the warning or alarm means 17 (at step S18).

Further, it is determined for any virtual position $N_k$ whether any of the nodes $N_{k+1}, N_{k+2} ... N_n$ ahead of the virtual vehicle position $N_k$ is in the automatic speed-reducing zone $Z_3$ (at step S19). If the answer is "NO", i.e., if any of the nodes $N_{k+1}, N_{k+2} ... N_n$ is not in the automatic speed-reducing zone $Z_3$, the processing is returned to step S3. If the answer at step S19 is "YES", i.e., if any of nodes $N_{k+1}, N_{k+2} ... N_n$ is in the automatic speed-reducing zone $Z_3$, then the automatic speed reduction means 18 is operated to perform the automatic speed reduction (at step S20).

The above-mentioned operation will further be described with reference to FIG. 6.

The second virtual turning locus radius $R_2$ calculated by the equation (6) assumes the largest value in an entrance of the operating section A, and becomes "0 (zero)" at the exit point of the operating section A at which the vehicle stops. Accordingly, the automatic speed reducing zone $Z_3$ is of a tapered triangular shape. Also, the first virtual turning locus radius $R_1$ calculated by the equation (5) assumes the largest value at the entrance of the operating section A, and becomes "0 (zero)" at the exit point of the operating section A at which the vehicle stops, and $R_1 > R_2$. Therefore, the alarming or warning zone $Z_2$ is of a tapered triangular shape extending on opposite sides of the automatic speed reducing zone $Z_3$. An area out of the alarming zone $Z_2$ and the automatic speed reducing zone $Z_3$ is the passable zone $Z_1$.

Figure 6:
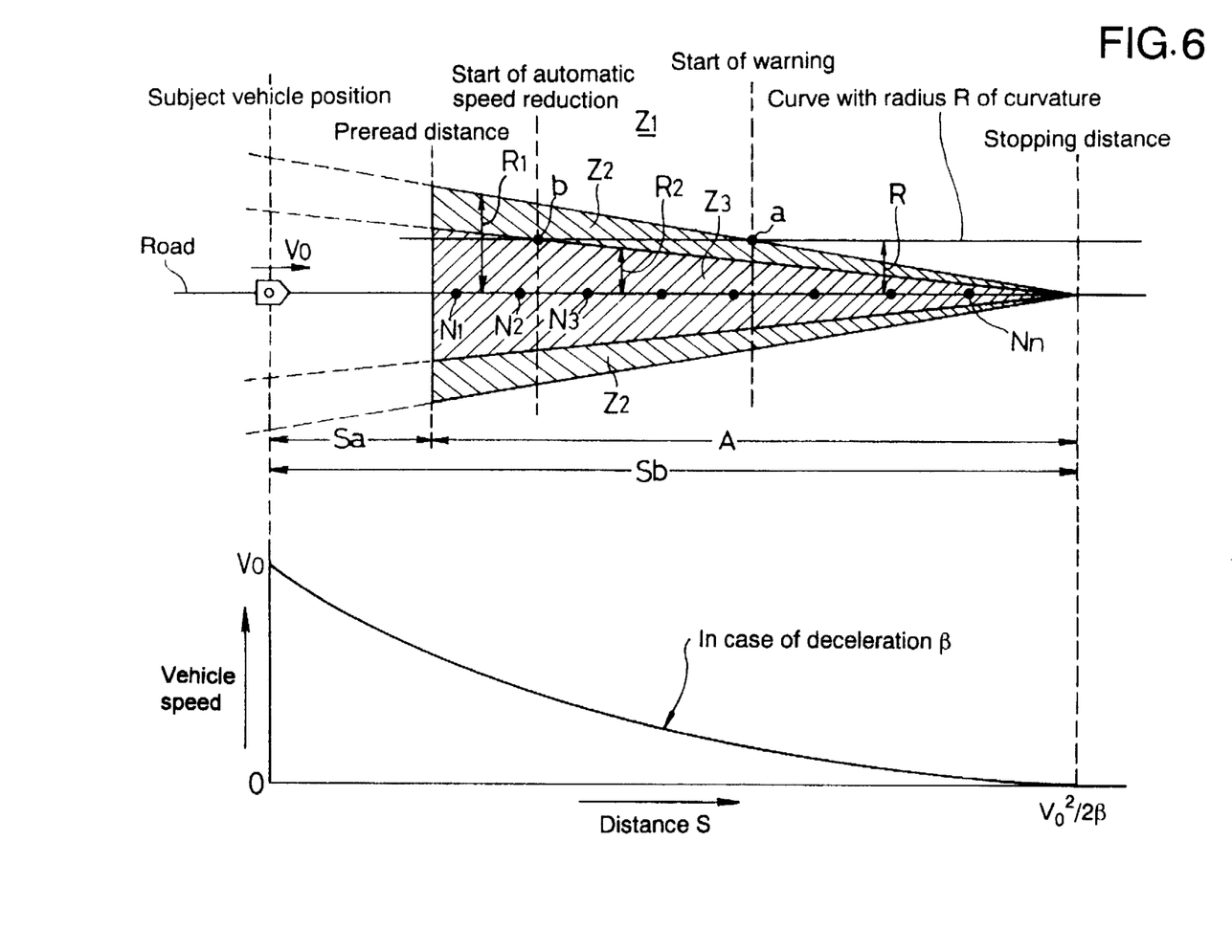
FIG. 6 is a diagram for explaining the operation of the invention.

On the other hand, in FIG. 6, if it is supposed that, for example, a curve having a radius R of curvature exists within the operating section A on the road, then a point "a" at which a straight line representing a curve having the radius R of curvature intersects an outer border of the warning zone $Z_2$ is a warning start point. When the curve approaches the warning start point, a warning is provided. Also, a point "b" at which the straight line intersects an outer border of the speed reducing zone $Z_3$ is an automatic speed-reduction start point. When the curve approaches the automatic speed-reduction start point, the speed reduction is started. Accordingly, if a curve has a radius R of curvature larger than the largest first virtual turning locus radius $R_1$ at the entrance into the operating section A, a straight line representing the curve having the radius R of curvature doesn't intersect the warning zone $Z_2$ nor the automatic speed reducing zone $Z_3$, and neither the warning nor the automatic speed reduction are performed.

As described above, the passable vehicle speed $V_k$ is calculated on the assumption that voluntary braking at a point short of the curve is predicted by the driver's visual viewing or experience, and the speed of the vehicle is reduced at the reference deceleration β previously set by the voluntary braking. Therefore, the passable vehicle speed $V_k$ is lower at the point farther away from the vehicle position. Accordingly, the zone $Z_1$, $Z_2$ and $Z_3$ established based on the passable vehicle speed $V_k$ are also determined with the driver's voluntary braking taken into consideration. This makes it possible to avoid the warnings and the automatic speed reduction otherwise unnecessarily frequently provided by the warning means 17 and the automatic speed reduction means (18), respectively, and to provide only the necessary warning and the automatic speed reduction at a minimum.

A second embodiment of the present invention will now be described with reference to FIG. 7.

In the second embodiment, in place of the reference deceleration β in the first embodiment, a first reference deceleration $β_1$ and a second standard deceleration $β_2$ are established. The passable vehicle speed $V_k$ at each node $N_k$ calculated at step S8 in the flow chart shown in FIG. 2 is set at two values in correspondence to the first reference deceleration $β_1$ and the second reference deceleration $β_2$ ($β_2>β_1$). More specifically, the first passable vehicle speed $V_{k1}$ corresponding to the first reference deceleration $β_1$ is calculated according to the following equation (7):

$$V_{k1}=(V_0^2-2β_1S_k)^{1/2} \quad (7)$$

The second passable vehicle speed $V_{k2}$, corresponding to the second reference deceleration $β_2$ is calculated by the following equation (8):

$$V_{k2}=(V_0^2-2β_2S_k)^{1/2} \quad (8)$$

Then, the first virtual turning locus radius $R_1$ for determining the outer border of the warning zone $Z_2$ for providing a warning is calculated using the first reference lateral acceleration $α_1$ and the first passable speed $V_{k1}$ according to the following equation (9):

$$R_1=V_{k1}^2/α_1 \quad (9)$$

The second virtual turning locus radius $R_2$ for determining the outer border of the automatic speed reducing zone $Z_3$ for performing the automatic speed reduction is calculated using the second reference lateral acceleration $α_2$ and the second passable vehicle speed $V_{k2}$ according to the following equation 10):

$$R_2=V_{k2}^2/α_2 \quad (1)$$

Figure 7:
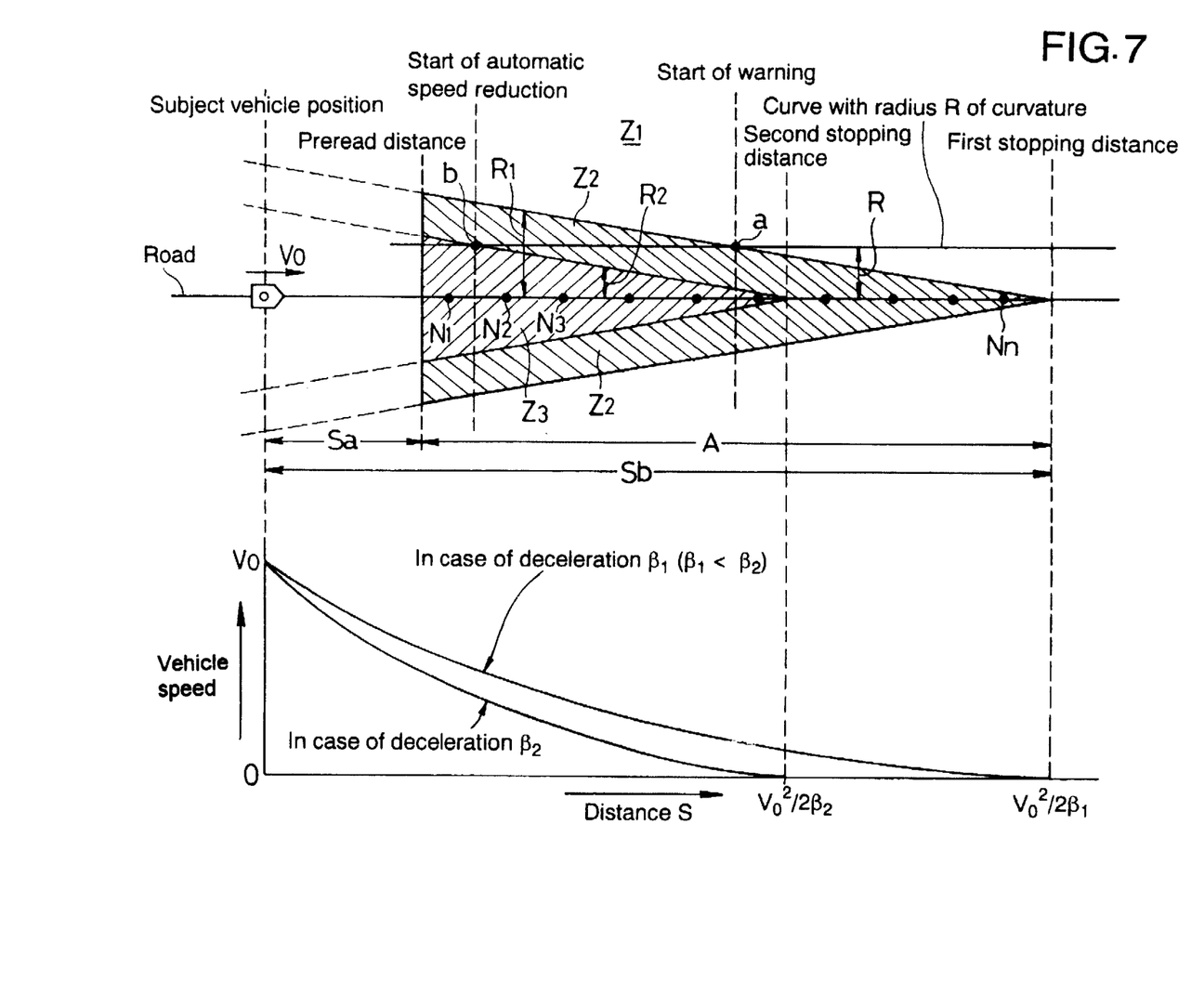
FIG. 7 is a diagram for explaining the operation of a second embodiment of the present invention.

It is clear from a comparison of FIGS. 6 and 7 that the warning zone $Z_2$ in the second embodiment (see FIG. 7) is wider than the warning zone in the first embodiment. Thus, the time from the warning provided up to the start of the automatic speed reduction is adequately assured and the driver is afforded sufficient time for braking on his own.

Although the embodiments of the present invention have been described in detail, it will be understood that the present invention is not limited to the above-described embodiments, and various modifications in design may be made without departing from the spirit and scope of the invention defined in the appended claims.

What is claimed is:

1. A vehicle control system, comprising:

map information outputting means for outputting a map comprised of a plurality of coordinate points representing a road;

vehicle position detecting means for detecting a position of a vehicle on said map;

vehicle speed detecting means for detecting a vehicle speed;

operating-section calculation means for calculating an operating section in which it is determined whether said detected vehicle speed is appropriate while driving in said operating section;

passable vehicle speed calculation means for calculating a passable vehicle speed at a virtual vehicle position which is established in said operating section, based on said detected vehicle speed and a distance from said vehicle position to said virtual vehicle position;

zone establishing means for establishing a passage determining zone having said passable vehicle speed as a criterion based on said virtual vehicle position;

passing condition determining means for determining a passing condition by comparing said passage determining zone with a coordinate point located ahead of said virtual vehicle position within said operating section; and vehicle control means for controlling said vehicle based on a result of the determination by said passing condition determining means.

2. A vehicle control system according to claim 1, wherein:

said passable vehicle speed calculation means sequentially establishes a plurality of said coordinate points included within said operating section as virtual vehicle positions, and determines said passing condition when passing through the coordinate points ahead of said virtual vehicle position.

3. A vehicle control system according to claim 1, wherein:

said zone establishing means calculates a radius of a virtual turning locus of said vehicle based on said passable vehicle speed, and establishes said passage determining zone based on the calculated radius of said virtual turning locus.

4. A vehicle control system according to claim 1, wherein:

said passable vehicle speed calculating means calculates said passable vehicle speed as a vehicle speed which is obtained on an assumption that a speed reduction is conducted at a predetermined reference speed-reducing rate from the vehicle position to said virtual vehicle position.

5. A vehicle control system according to claim 1, wherein:

said vehicle control means comprises a means for providing a warning to a driver of said vehicle.

6. A vehicle control system according to claim 1, wherein:

said vehicle control means comprises a means for controlling the speed of said vehicle.

7. A vehicle control system according to claim 1, wherein:

said passage determining zone includes a warning zone for providing a warning to a driver of said vehicle and an automatic speed-reducing zone for automatically reducing the speed of said vehicle.

8. A vehicle control system according to claim 7, wherein:

said zone establishing means establishes said warning zone and said automatic speed-reducing zone based on a predetermined reference lateral acceleration.

9. A vehicle control system according to claim 7, wherein:

said zone establishing means establishes said warning zone and said automatic speed-reducing zone based on a predetermined reference deceleration.

* * * * *

UNITED STATES PATENT AND TRADEMARK OFFICE
CERTIFICATE OF CORRECTION

PATENT NO.  :  5,748,476
DATED       :  05 May 1998
INVENTOR(S) :  Hiroshi Sekine, Kazuya Tamura It is certified that error appears in the above-identified patent and that said Letters Patent is hereby corrected as shown below:

Column 2, line 3, change "the warning and the" to --a warning and--.
Column 4, line 14,   before "symbol" insert --the--.
Column 5, line 15, change "Sk" to --$S_k$--;
         line 55, change "corner" to --curve--.
Column 8, line 1, change "(1)" ro --(10)--.

Signed and Sealed this

Twenty-eighth Day of July, 1998

Attest:

BRUCE LEHMAN

Attesting Officer     Commissioner of Patents and Trademarks